(12) United States Patent
Bibaud et al.

(10) Patent No.: US 9,756,775 B2
(45) Date of Patent: Sep. 12, 2017

(54) MEMORIAL FLOWER PLANTING PRODUCT MADE WITH OR WITHOUT HUMAN OR PET CREMATED REMAINS

(71) Applicants: Remy Alyce Bibaud, Pittsburgh, PA (US); Lori Ann Davidson, Pittsburgh, PA (US)

(72) Inventors: Remy Alyce Bibaud, Pittsburgh, PA (US); Lori Ann Davidson, Pittsburgh, PA (US)

(73) Assignee: Cherished Ones LLC, Pittsburgh, PA (US)

( * ) Notice: Subject to any disclaimer, the term of this patent is extended or adjusted under 35 U.S.C. 154(b) by 311 days.

(21) Appl. No.: 14/792,586

(22) Filed: Jul. 6, 2015

(65) Prior Publication Data
US 2016/0000002 A1 Jan. 7, 2016

Related U.S. Application Data

(60) Provisional application No. 62/021,541, filed on Jul. 7, 2014.

(51) Int. Cl.
*A01C 1/04* (2006.01)
*A01G 9/10* (2006.01)

(52) U.S. Cl.
CPC ............ *A01C 1/046* (2013.01); *A01G 9/1086* (2013.01)

(58) Field of Classification Search
CPC .......... A01G 9/00; A01G 9/10; A01G 9/1086; A01C 1/04; A01C 1/046; A61G 17/004; A61G 17/007

USPC ............ 47/1.01, 56, 1.01 R, 1.01 F, 58.1 R, 47/58.1 SE; 27/1
See application file for complete search history.

(56) References Cited

U.S. PATENT DOCUMENTS

| | | | |
|---|---|---|---|
| 5,636,418 A * | 6/1997 | Vail, III | A61G 17/08 27/1 |
| 5,799,488 A * | 9/1998 | Truong | A01G 9/1086 27/1 |
| 6,192,624 B1 * | 2/2001 | Truong | A01G 9/1086 47/1.01 R |
| 7,665,195 B1 * | 2/2010 | Vazquez-Perez | A61G 17/08 27/1 |
| 2002/0032954 A1 * | 3/2002 | Vazquez-Perez | A01C 1/04 27/1 |
| 2006/0117653 A1 * | 6/2006 | Werth | A01C 1/044 47/56 |

(Continued)

FOREIGN PATENT DOCUMENTS

RU 2314666 C1 * 1/2008
RU 2533900 C2 * 11/2014

*Primary Examiner* — David Parsley
*Assistant Examiner* — Danielle Clerkley
(74) *Attorney, Agent, or Firm* — John Chandler

(57) ABSTRACT

A process for creating a shaped seed wafer is described. Ingredients for a growth medium are selected and mixed together. Pulverized remains or cremains from a pet or human are added. One or more varieties of perennial and/or annual seeds are added to the mixture. Water may be added during processing to get the mixture to stick together. The mixture with seeds is sheeted and shaped into a silhouette shape with a cutting tool before drying the shape to a final product. The product is a memorial flower or plant generating seed wafer that may be packaged and distributed for placing and germinating of plants at a desired location in memory of the deceased.

20 Claims, 6 Drawing Sheets

(56) References Cited

U.S. PATENT DOCUMENTS

| | | |
|---|---|---|
| 2006/0196117 A1 | 9/2006 | Kim |
| 2008/0141508 A1* | 6/2008 | Silva .................. H04N 7/18 27/1 |
| 2010/0199476 A1 | 8/2010 | Cummings |
| 2011/0094154 A1* | 4/2011 | Joaquin ............... A01G 1/046 47/65.8 |
| 2013/0316903 A1 | 11/2013 | Hughes |

* cited by examiner

MEMORIAL FLOWER PLANTING PRODUCT MADE WITH OR WITHOUT HUMAN OR PET CREMATED REMAINS

This application claims the benefit and filing date of U.S. provisional patent application having Ser. No. 62/021,541 and which was filed on 7 Jul. 2014.

BACKGROUND

Field

The present invention relates generally to compositions and methods for forming biodegradable, plantable and shaped products made with ingredients including seeds, soil and cremains, remains or ashes produced from cremation.

Related Art

Increasingly, society has been performing cremation of deceased loved ones. At a crematorium, a body is incinerated and the remains are then pulverized into ashes or a uniformly powdered product. This product is referred to herein as cremains for sake of convenience. For a typical human body, about 4-6 pounds (1.8 to 2.7 kg) of powdered cremains are produced. Cremains contain mostly calcium phosphates, minor minerals, and salts of potassium and sodium. After treatment, cremains generally are deliverable to a surviving family member.

Often, little attention is paid to the cremains after being produced from a crematorium. Sometimes the cremains are placed into a simple or decorative container. The container and cremains are then statically stored in a designated place of memorial of the deceased, or transported by a custodian and the cremains scattered at a place of interest to survivors some days, weeks or years after the deceased has been cremated. A scattering event results in loss of connection to the cremains.

SUMMARY

Embodiments and techniques described herein relate to creation of a biodegradable or nature-friendly composition that includes flower or plant seeds and the cremains of loved ones, be it people or pets. The composition is formed into one or more shaped seed wafers. The products are then made available for distribution to family and friends. The products may be easily transported and planted. The products provides a long-term generative, living memorial to the decedent.

More particularly, a shaped seed wafer may be made by adding approximately one measure of cremated and pulverized remains of a pet or human to at least twenty measures of a solid nutrient rich growth medium that includes soil or top soil, compost and bokashi. Perennial, annual or a combination of perennial and annual plant seeds are then mixed with the remains and growth medium. Green tea extract generated from steeped green tea leaves may be added to the mixture prior to forming the shaped seed wafers. Alternatively, color may be added by adding dried and pulverized green tea leaves to the growth medium, or by adding naturally based color enhancers.

Pieces or shaped seed wafers are preferably formed by rolling out, pressing or sheeting the mixture and then using silhouette cutting shapes to for individual seed wafers. Once cut out from a sheet or pressed into a mold, the shaped seed wafers are dried for a certain time such as at least 24 hours at room temperature, or dried to a certain desired moisture content. Optionally, letters, designs or marks may be cut into the top or sides of the shaped seed wafers. The letters or marks may spell out a message related to the decedent.

The growth medium may include a soil, a soil compost, a humus and a peat. Optionally, the growth medium includes a vermicompost or a post-ferment bokashi. Before mixing the cremains with the growth medium, the pH of the growth medium may be adjusted to within a range of preferred pH for the plant seeds taking into account a pH of the cremains.

This Summary is provided to introduce a selection of concepts in a simplified form that are further described below in the Detailed Description. This Summary is not intended to identify key or essential features of the claimed subject matter, and thus is not intended to be used to limit the scope of the claimed subject matter.

BRIEF DESCRIPTION OF THE DRAWINGS

While the appended claims set forth the features of the invention with particularity, the invention, together with its objects and advantages, is more readily appreciated from the following detailed description, taken in conjunction with the accompanying drawings. Throughout, like numerals generally refer to like parts. Unless specifically indicated, the components and drawings are not shown to scale.

DETAILED DESCRIPTION

Overview. A living memorial product is produced by mixing annual seeds, perennial seeds or a combination of annual and perennial seeds with at least pulverized cremains and a growth medium such as a soil. The product is a memorial because the product includes cremains from an animal or human family member. The product is living because it can be planted, watered and cared for, and produces living plants corresponding to the types of seeds that are placed in the mixture. The seeds may be selected by or in remembrance of a particular individual thereby making the product individualized to the particular deceased individual. The product may be separated and formed into a few or many individual pieces and therefore may be distributed to a wider audience than previously possible as compared to distribution of ordinary cremains.

The pieces are designed to be distributed to those who had a connection with the deceased. The pieces may be formed into one or more shapes selected for remembrance of each particular deceased individual. Each type of seed (and thereby plant) incorporated into the pieces may be correlated with each particular shape and/or with each particular deceased individual.

By forming cremains into a solid product, the cremains have a greater longevity and purpose. The product is more easily transported, handled and placeable in a specific location. The specific location is later identifiable by the plants germinated from the seeds in the product. By being plantable, that is integrated with other materials, the actual cremains are more likely to persist in a designated location as compared to just sprinkling cremains in a powdered form in the same location. Cremains in their powdered form are soon dispersed and lost. Thus, through the use of the product described herein, a specific location can be imbued with a physical reminder of the deceased, a reminder that persists for months or years for the benefit of the living. Such location may be in a patio pot, indoor planter, along a walking trail, or in a garden or flowerbed.

Figure 1:
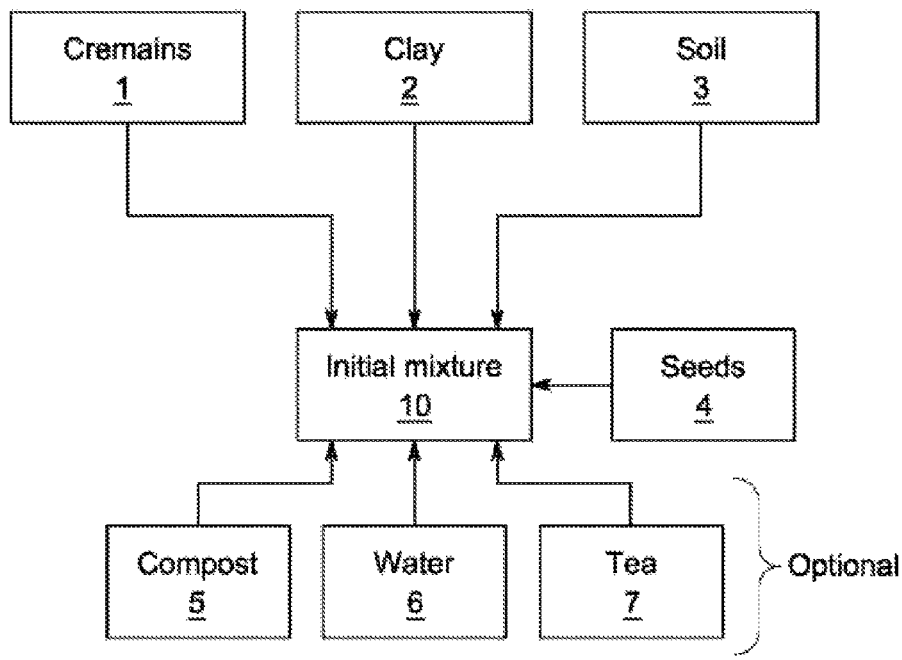
FIG. 1 illustrates basic components of the product including a soil matrix, and one or more types of seeds.

FIG. 1 illustrates basic components or ingredients of the product. With reference to FIG. 1, the an initial mixture 10 is made from and preferably includes pulverized cremated remains from a body 1, clay 2, and a loose mineral-based mix, soil or dirt 3. While "soil" 3 is referenced herein, this term is shorthand for horticultural mulches, growing media, landscape soils, planting mixes and the like. Specific examples of soil 3 are provided to illustrate the nature of the product made according to the process described herein.

Referring again to FIG. 1, seeds 4 are added once the cremains 1, clay 2, and soil 3 are initially mixed. Further mixing is in order to distribute the seeds 4 through the initial mixture 10. One source of soil 3 is one or more of a mineral clay and top soil. As is understood in the industry, soil 3 may be found under various names include potting soil, planting mix, gardening soil, top soil and the like. As used herein, unless stated otherwise, terms follow the definitions of the Mulch and Soil Council (MSC) of Shallowater, Tex.

Optional ingredients may be added to the initial mixture 10 such as compost 5, water 6 and tea 7 in one or more various forms including a compost tea such as a bokashi tea. Humus and a form of peat may optionally be added in low amounts to the initial mixture 10 depending on concentrations or amounts of the other ingredients and depending on the seeds 4 added. Compost 5 as used herein includes one or more of vermicompost, soil compost, and post-ferment bokashi. The compost 5 may be pH balanced so as to encourage a modest pH for the mixture 10. A small quantity of water 6 may be added to ensure that the initial mixture 10 holds together for shape forming as further described below. Preferably, the soil 3 and other ingredients are selected to produce a desired overall pH of the mixture that is ideal for the seeds 4 selected for mixture 10 and to account for the pH of the cremains 1. The pH of the mixture 10 may be adapted or matched to the particular seed or seed mix 4 added to the mixture 10.

Cremated remains, referred to herein as cremains 1, may be from an animal or human body. Preferably, before being added to the other ingredients, the cremains 1 have been prepared according to a commercially and legally acceptable process which includes combusting a body in a furnace at a temperature typically in excess of 1800 degrees F. so as to drive all of the water and most of the sulfur from the biological body mass. For use in the product described herein, cremains 1 may be generated from a human body or pets and other animals such as cats, dogs, horses, rabbits and other animals susceptible to cremation. The greater amount of cremains 1 initially available, the greater amount of final, shaped product that can be made. The finished products may include a relatively small amount of cremains 1 per piece or shape, or a relatively large amount of cremains 1 per piece or shape depending on a desired target amount of product material during or desired number of shapes to be produced after mixing. For example, if it is desired to create 100 pieces of finished product at about 2 ounces of dried weight each, a proportionate amount of other initial ingredients are required. While there is no minimum of cremains 1 per pound of initial mixture 10 required, preferably the mixture includes about 0.3 ounces of cremains 1 per pound of initial mixture 10. Preferably, the cremains 1 are added to the other ingredients a little at a time by sprinkling a thin layer of cremains 1 over the other ingredients, and then mixing the thin layer of cremains into the other ingredients until all of the cremains 1 have been added and the initial mixture 10 is substantially homogeneous.

Figure 2:
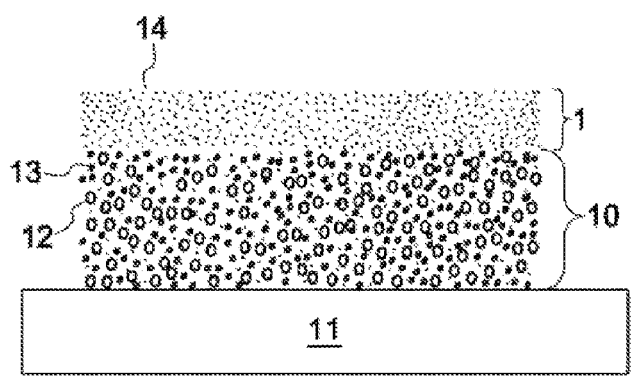
FIG. 2 illustrates a soil matrix with animal or human cremated remains sprinkled and mixed into a matrix formed with at least some of the components illustrated in FIG. 1.

FIG. 2 illustrates a layer of cremains 1 sprinkled over a mixture 10 of clay 2 and soil 3. The soil 3 as illustrated here may include fibrous material and one or more forms of compost 5. The mixture 10 is supported on a flat surface 11. Particles of various sizes are visible in the mixture 10. For example, relatively larger particles 12 are intermixed with relatively small particles 13. The larger particles 12 may be solid rocks, decomposed matter, sand or colloids. The smaller particles 13 may be sand, mineral material and the like. A distribution of particle sizes is preferable so as to promote growth of seeds 4 and retention of water 6 in the finished product. Substantially uniform-sized particles 14 are visible in the layer of powdered cremains 1. The size of the layer of powdered or pulverized cremains 1 is enhanced in FIG. 2 for sake of illustration. The cremains 1 are added incrementally to the mixture 10 as mixing proceeds so as that the cremains 1 become substantially uniformly dispersed throughout the mixture 10 when mixing is sufficient or complete.

The initial mixture 10 prior to adding seeds optionally includes compost 5, such as a vermi-compost, and green tea 7. These ingredients are not illustrated in FIG. 2 for sake of simplicity of illustration. The green tea 7 may be added to the other ingredients either in liquid form or in powdered form by pulverizing and adding the powder to the mixture similar to the way that the cremains 1 are added to the mixture. The addition of an optional color additive provides aesthetically appealing color in the final product as observed by end consumers after the shaped products reach a steady-state amount of moisture.

During processing, the initial mixture 10 may be split into two or more batches and green tea 7 may be added to only one of the batches so that two shades or hues of the final product are available for distribution for each set of cremains. Other variations are possible. For example, the initial mixture 10 may be split into three batches, and differing amounts of color additives may be added to each one to produce three distinct hues of final product. One of the batches may be mixed without any color additive into such batch to provide a baseline color in the final product. As an example of another variation, one of the batches may be processed as follows. The initial mixture 10 is spread onto a surface and rolled or spread out flat. Then, a dusting of cremains 1 is spread over the top of the initial mixture 10. Shapes are then formed from the flattened material. The dusting is sufficient to give an appearance of glazing or frosting of the top surface of the shaped pieces after the pieces are allowed to dry to a completed state (e.g., equilibrium with the environment at room temperature).

Other naturally occurring, organic coloring materials or ingredients also may be added to a same or subsequent batches so as to provide a variety of colors other than green in the finished and shaped product. For example, a natural red, orange or purple coloring agent may be added. During mixing, water 6 may be added to make the initial mixture 10 easier to work and form into shapes. The initial ingredients are loosely and preferably homogeneously mixed before adding the seeds 4.

Figure 3:
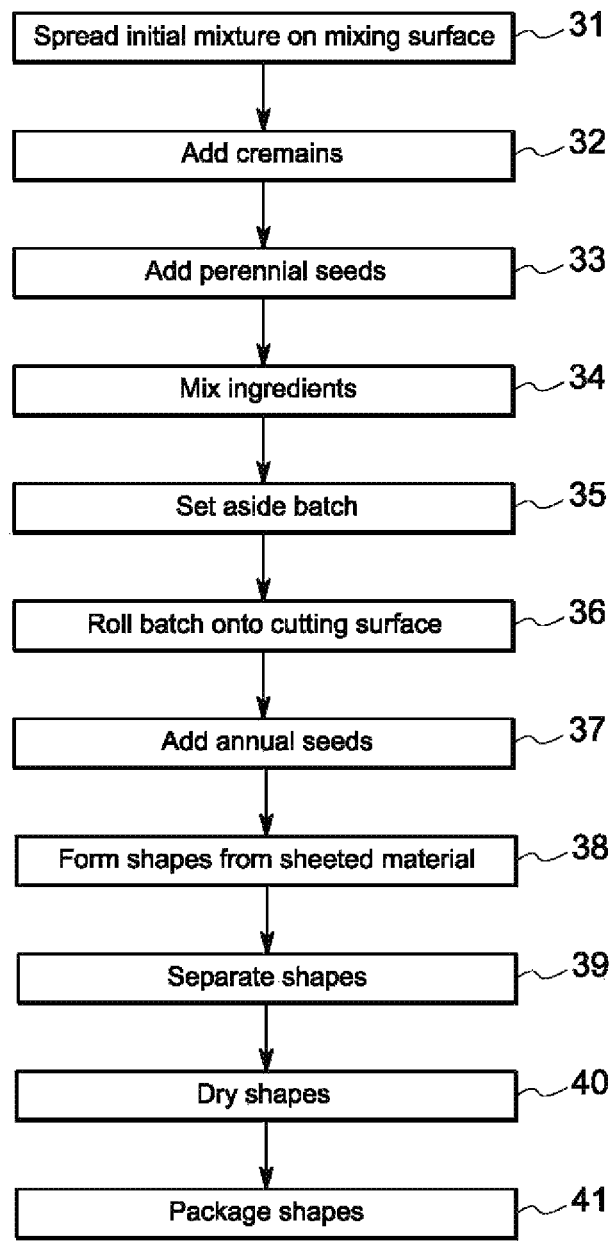
FIG. 3 illustrates a method for forming the matrix of material prior to forming shapes according to a first illustrative embodiment.

Mixing. FIG. 3 illustrates a method for forming the matrix of material prior to forming shapes according to a first illustrative embodiment. The mixing may be done in batches depending on the size of available mixing equipment and the desired color hue for each batch. While the proportions of the illustrative embodiment can be scaled up, the proportions of each of the components are presented here to provide a first illustrative composition of the product.

With reference to FIG. 3, the first step 31 is to spread about seven ounces of soil about one-quarter inch thick across a surface. At the second step 32, about one-half tablespoon of pulverized cremains are sprinkled evenly across the soil. At the third step 33, about one-half of a teaspoon of a mix of perennial seeds are sprinkled evenly across the soil and cremains. At the fourth step 34, the composition is cut or mixed together. Alternatively, the composition may be kneaded into a ball or mass until the ingredients are intermingled with each other. At the fifth step 35, the mixture is optionally formed into a ball or mass so that it can be set aside until other batches are complete and for subsequent processing.

At the sixth step 36, the mass is rolled out onto a surface such as with a stone roller or rolling pin or conventional rolling machine until the material is about one-quarter of an inch thick. The mass is firmly pressed so as to encourage substantial binding of the material. Optionally, a small amount of water is added to the mass so as to encourage adhesion of the matter. The edges may require pressing to ensure a coherent mass at the edges in subsequent steps. At an optional seventh step 37, a few annual seeds are sprinkled onto the surface of the material. The annual seeds provide color and texture, and further provide quick blooming when the material is later planted. The quick blooming annual seeds provide an improved responsive growth than otherwise possible with just the perennial seeds since the thoroughly mixed-in perennial seeds typically require a cold season or wintering season before germinating and growing.

At the eight step 38, shapes are formed from the sheeted material. The formed shapes are referred generally herein as shape wafers or seed wafers. The shapes are preferably formed through the use of thin metal cutters analogous to cookie cutters that do not materially disturb mixed soil ingredients immediately adjacent to the cutting surfaces. Shapes are selected so as to lie proximate and close to each other for sake of efficiency. The cutters may be formed so as to cut a plurality of the same shape or a mix of various shapes so as to reduce the number pressings of the tool into the material once the material is sheeted. In this way, a maximal number of shape wafers may be created from a single sheet of rolled material.

Material that crumbles or fails to be formed into a shape wafer may be accumulated or aggregated and recycled back into the rolling step 36 and cutting process at step 38.

In the next step 39, the shaped seed wafers are separated 39. The shaped seed wafers may be lifted from the surface such as with a spatula, and are placed on a non-stick surface such as wax paper, an oiled metal surface such as a tray, a solid flat surface, or are placed on a Teflon®-treated surface or rack. Subsequently, at the next step 40, the shapes are dried for 24-36 hours to allow for the shapes to lose moisture and harden—until the seed wafers reach a steady moisture content. Subsequent to drying, at the next step 41, the shapes are packaged. During processing, separating, and so forth, the shapes may be handled by spatula, waxed paper and metal sheets. Surfaces may be treated with oil or other non-sticking agent so as to discourage breakage of the shaped seed wafers. After being packaged, the shaped seed wafers may be planted in a traditional setting according to traditional gardening principles.

For the amounts of ingredients listed, approximately 12-30 shaped seed wafers may be created. From this number, an approximate or average size of wafer is deducible. Preferably, for each batch of material, about 24 shapes are desired in terms of packaging and drying a custom product. Any excess material that is not shaped into shape wafers may be rolled into seed balls and thereby form an alternative and three-dimensional embodiment of a product made from the composition described above. Alternatively, the entire batch of material may be formed into a series of seed balls of the same size, or of various sizes. A preferred size of such seed balls is from about one-quarter to one and one half inches in diameter. Dried seed balls may be packaged with the completed shaped seed wafers.

According to an alternative shape forming process, the initial material 10 may be pressed into moulds. The moulds may be of a same two dimensional shapes such as the those described in relation to sheeting and cutting described in relation to FIG. 3. Alternatively, the moulds can be three dimensional in nature. For example, the moulds may be of a teddy bear with limbs and torso of varying thicknesses. The material may be pressed into the moulds and the moulds may be allowed to dry before the shaped seed wafers are removed from the moulds. Prior to pressing in the initial seed mixture, the mould surfaces may be treated with a bio-friendly anti-sticking agent such as a biodegradable vegetable oil, water, or an aqueous tea solution.

Other sets of proportions of ingredients are presented here for sake of illustration. In a first or "custom" set, 24-30 seed wafers are produced by mixing 6.8 ounces of planting matrix (e.g., clay, soil, compost, tea), 0.0833 ounces of perennial and annual seeds, and 0.25 ounces of pet cremains. In a second set such as part of a kit with pre-measured portions, 12-14 seed wafers are produced from 4.0 ounces of planting matrix, 0.0833 ounces of perennial and annual seeds, and 0.0833 ounces of pet cremains. In a third or pre-made set, 24-30 seed wafers are produced by mixing 6.8 ounces of planting matrix and 0.0833 ounces of perennial and annual seeds, without any cremains. In a fourth set that does not include any cremains, 120-140 seed wafers are produced in bulk from 40 ounces of planting matrix and 1.33 ounces of perennial and annual seeds. Each of these sets of ingredients may be scaled up or down as desired.

Figure 4:
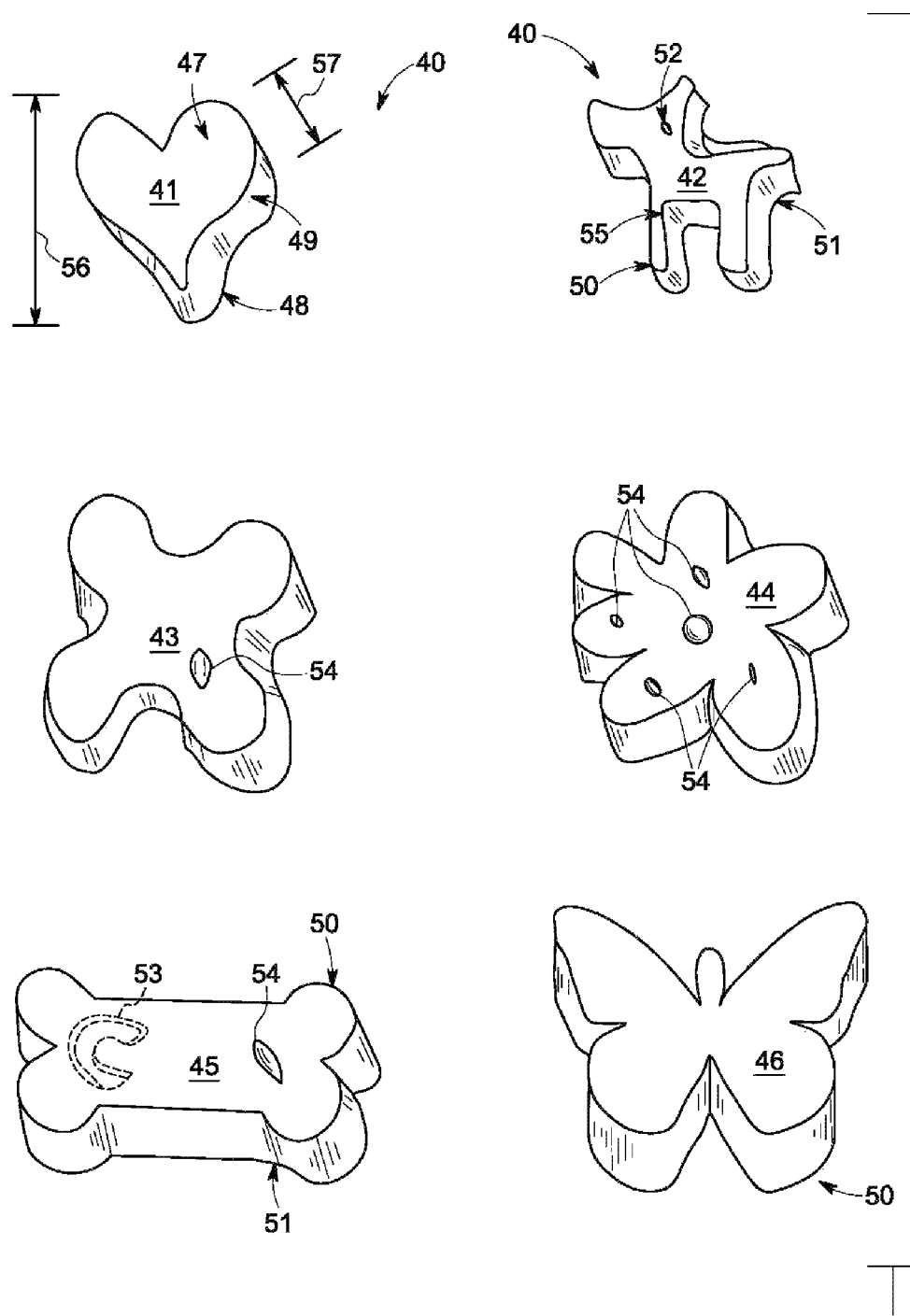
FIG. 4 illustrates examples of shape wafers formed of the mixture that created by the method illustrated in FIG. 3.

FIG. 4 illustrates examples of shaped seed wafers derived from the material created from the process described and illustrated in reference to FIG. 3. With reference to FIG. 4, various shapes 40 may be made from the mixture including, for example, the following: a heart shape 41, a dog or cat silhouette shape 42, a butterfly or clover shape 43, a flower shape 44, a dog bone shape 45 and a butterfly shape 46. Two- and three-dimensional shapes other than those shown in FIG. 4 may be made. For example, a dog paw silhouette shape may be made which conveys that the seed wafer is for a memorial to a pet. A shape or silhouette of the seed wafer 40 may be selected or customized according to the wishes of the decedent or according to the desires of the survivors consistent with a shape that is an appropriate memorial of the decedent.

Various features of the shapes 40 are evident in FIG. 4. For example, each shaped seed wafer 40 includes a top surface 47, a bottom surface 48, and a side surface 49—each surface being substantially planar due to the process described in relation to FIGS. 2-3. The side surface 49 of a shaped wafer 42 includes various convex curvatures 50 and potentially concave curvatures 51. The top surface 47 may include an indentation 52 as shown in shaped wafer 42 or a series of lines or indentations to give further artistic impression to the profile or silhouette of the seed wafers 40. The top surface 47 may also include other features such as letters 53 illustrated in shaped seed wafer 45. Such letters 53 may for initials or words in the seed wafers 40 for further customizing for remembrance of the deceased cherished one. Yet other feature may be a seed 54 that is exposed at a surface as shown in seed wafers 43, 44 and 45. While any shape or silhouette is possible, there are limitations as to the types of shapes or silhouettes that made be formed into a shaped seed wafer 40 according to the limitations of the process and ingredients used.

Preferably, corners and sharp changes in direction of the outer side surface 49 are not desired because of the possibility of crumbling of the final dried seed wafer at such points. Similarly, thin extensions of material such as a leg 55 of an animal silhouette 42 may result in breakage during handling, packaging or shipment. Accordingly, shapes 40 are created with this characteristic in mind. Likewise, thinness may be formed by having an overly large first dimension 56 (either in a horizontal or vertical direction) relative to the thickness 57 of the seed wafer material. Long shapes tend to break easily. Shapes 40 that are closer to a square, circle or oval are best in terms of longevity of the product between the time of formation of the seed wafers 40 and time of consumption and planting of the same.

Figure 5:
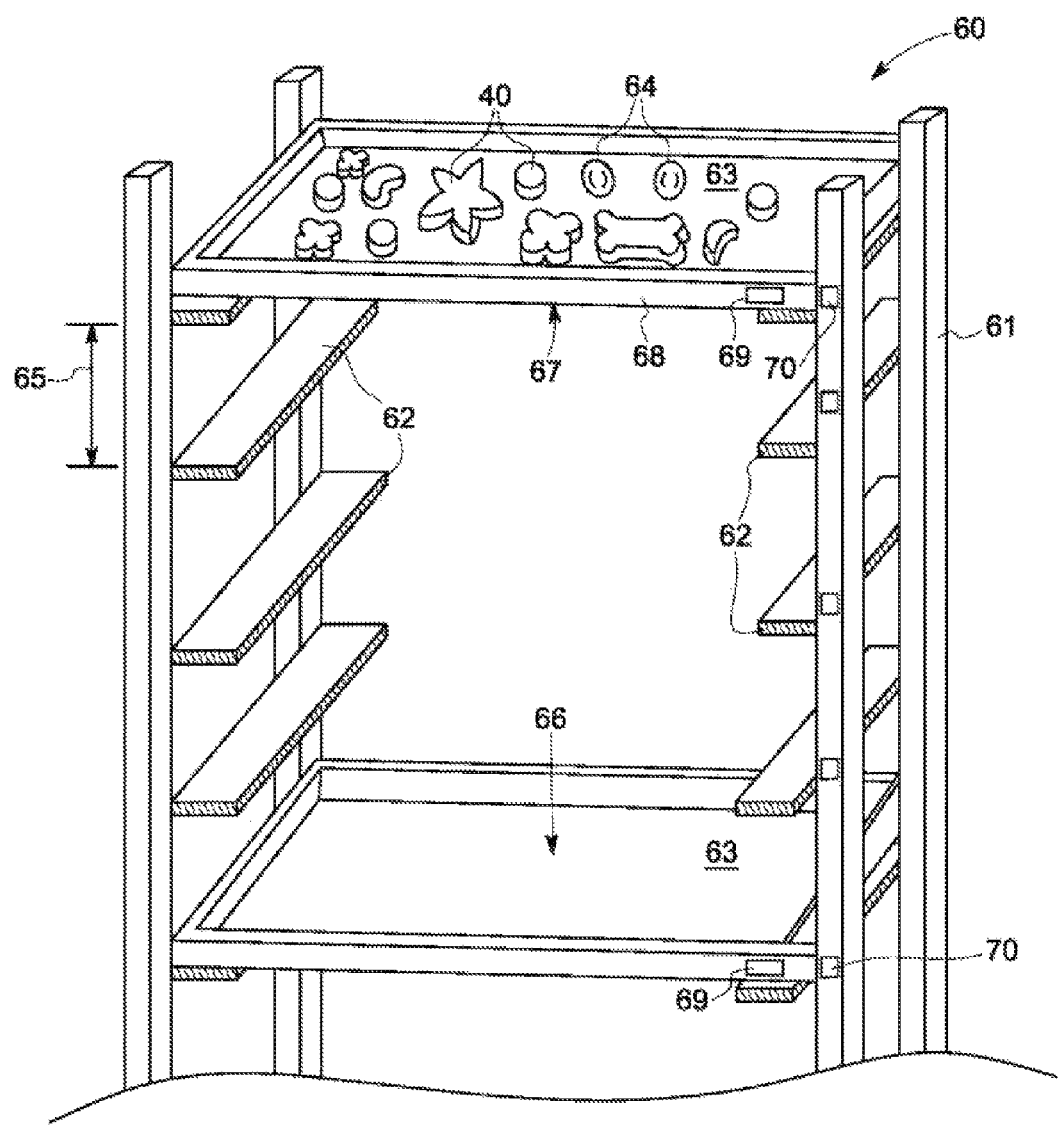
FIG. 5 illustrates a rack system for drying shaped seed wafers 40 into a final and packagable product.

FIG. 5 illustrates a rack system 60 for drying shaped seed wafers 40 into a final and packagable product. With reference to FIG. 5, a rack system 60 includes vertical support structures 61 that provide rails 62 for drying trays 63. For sake of simplicity, only two drying trays 63 are illustrated in a resting position, each on a pair of rails 62. Each of the trays 63 includes a top surface 66, a bottom surface 67 and a substantially vertical side wall 68. On the top tray, as illustrated, in addition to shaped wafers 40 there may be seed balls 64 formed from the same batch of material as used to form the shaped seed wafers 40. Preferably, the seed wafers 40 and seed balls 64 are left undisturbed and dried between 24-36 hours on the tray 63.

Each tray preferably includes a tray label 69. A tray label 69 corresponds to a rail label 70 such that during processing (e.g., sheeting, cutting and separating), one batch of seed wafers 40 corresponding to a first cremains may be distinguished from other batches of seed wafers 40 and other cremains. In this way, a first cremains may be efficiently tracked during processing. An anonymizing code may be placed on each of the tray label 69 and a rail label 70 so that a person or human processor may not be able to identify the decedent during processing of cremains and creation of the seed wafers 40 and seed balls 64.

Any number of drying trays 63 may be used in the rack system 60. A pair of consecutive racks may be separated by a distance 65. Preferably, this distance 65 is as small as possible to accommodate a large number of trays 63 and concomitantly as large a number as possible of seed wafers 40 in the rack system 60 due to a relatively small amount of moisture that must be extracted or dried from the seed wafers 40. A fan or other ventilation source (not shown) may be placed and operated proximate to the rack system 60 to assist in drying the seed wafers 40. While drying may be performed at most temperatures, it is preferable to dry the seed wafers 40 and seed balls 64 at or above at least 60 degrees Fahrenheit.

What is not illustrated in FIG. 5 is a machine that may be designed to mix the ingredients discussed in relation to FIG. 1 and which can sheet the mixture and cut the mixture into shapes such as those shown in FIG. 4. The rack system 60 would then be able to house the seed wafers 40 and seed balls 64 until packaged.

Figure 6:
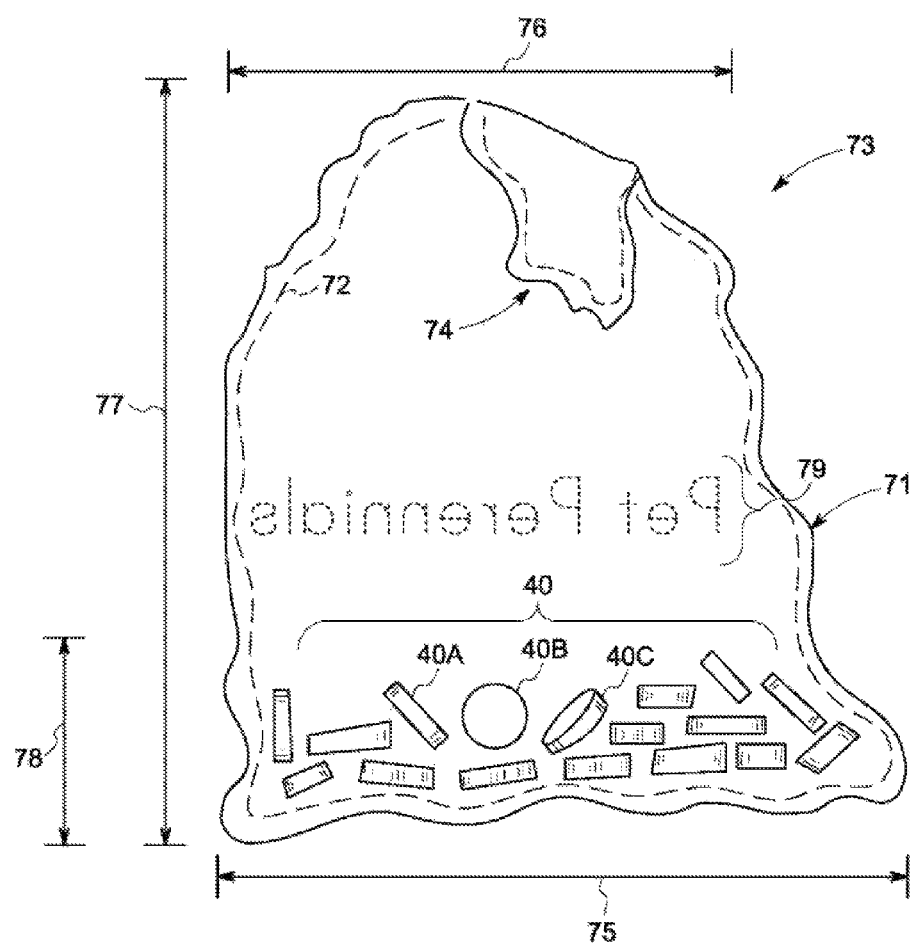
FIG. 6 illustrates a cross-sectional side view of shaped seed wafers in a seed wafer bag that is susceptible to labeling and designed for housing the seed wafers for the purpose of distribution and prior to use according to a first illustrated embodiment.

FIG. 6 illustrates a cross-sectional side view of shaped seed wafers in a seed wafer bag that is susceptible to labeling and designed for housing the seed wafers for the purpose of distribution and prior to use according to a first illustrative embodiment. With reference to FIG. 6, a plurality of dried and finished shaped seed wafers 40 are loosely housed in an inner bag 72 nested inside of an outer bag 71. The inner bag 72 is preferably made from a different material than the outer bag 71. For example, the inner bag 72 may be a recycled crinkle paper, and the outer bag 71 may be made from a breathable somewhat porous fabric a canvas, cotton, denim or a broadcloth material. Such outer bag is susceptible to printing, embroidery and the like for commercial purposes and consumer appeal. The inner bag 72 is preferably made from a non-porous material such as a plastic, a polyvinyl polymer, aluminum, tin or waxed paper. The inner bag 72 retains any breakage particles that may be generated through handling of the transport unit 73. The transport unit 73 is formed with a top opening 74 through which the seed wafers 40 are inserted. The transport unit 73 may be formed so as to have a first width 75 at the bottom of the transport unit 73 that is greater than a second width 76 at the top of the same. A tapered transport unit 73 discourages movement, crumbling and disintegration of the shaped seed wafers 40. The transport unit 73 is formed so as to have a depth 77 that is substantially greater than the fill height 78 of the collection of shaped seed wafers 40. That is, the depth of the shaped seed wafers 40 should be as shallow as possible, such as only three to four wafers deep. As illustrated, the shaped seed wafers 40 are loosely stacked. In particular, the shaped seed wafers 40 may lie in a variety of orientations such as in a first orientation 40A, a second orientation 40B or a third orientation 40C that is oblique to the cross sectional view. The outer bag 71 may be branded or labeled such as with a label 79 that may include a product name or trade name associated with the shaped seed wafers 40. In this case, "Pet Perennials" is illustrated as one example of a label for the products that presumably include cremains from a pet and perennial plant seeds. The label 79 alternatively may be labeled with a quote, a name of a decedent, or the name of a funeral establishment or memorial location.

Figure 7:
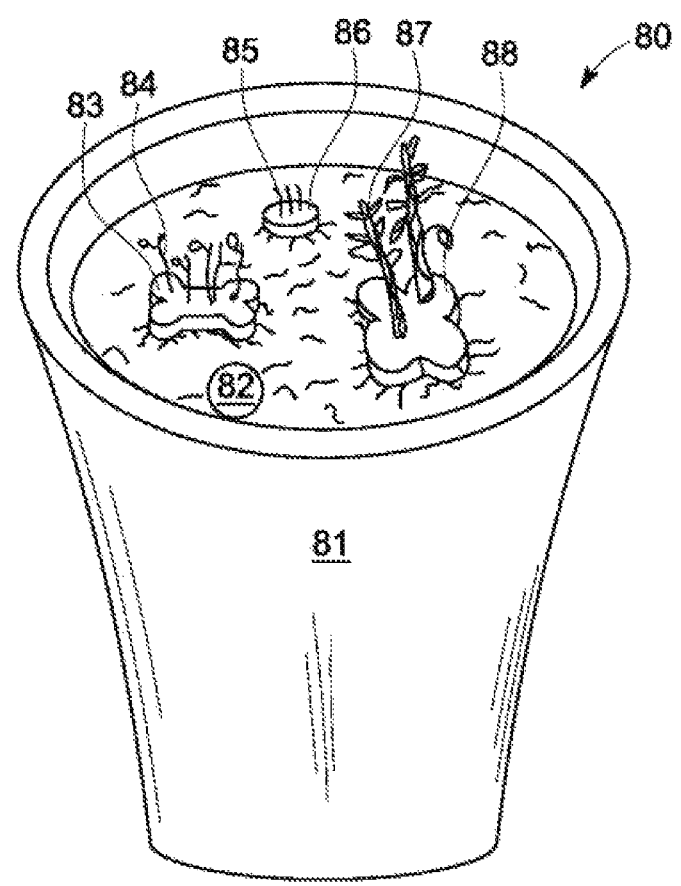
FIG. 7 illustrates sprouted shaped seed wafers in a flower pot.

FIG. 7 illustrates sprouted shaped seed wafers in a gardening pot. With reference to FIG. 7, a planting system 80 includes a pot 81 in which is partially filled with a growth medium 82. A set of three shaped seed wafers 83, 86 and 88 have been placed therein. The shaped seed wafers 83, 86 and 88 are each illustrated at a different point of time after the shaped seed wafers have been dropped onto the growth medium 82. The first shaped seed wafer 83 represents a time about two to three weeks after germination of the seeds therein. Leaves are visible on the plants 84 germinating therein. The second shaped seed wafer 86 represents a time about one to two weeks after germination of the seeds therein. The seeds have sprouted and the plants 85 are pushing upward. The third shaped seed wafer 88 represents a time about four to six weeks after germination of the seeds therein. The plants 87 are stronger and thicker. The plants 87 are not drawn to scale but illustrate what is observed in practice, that the flowering plants 87 grow strongly in the immediate environment provided by the seed wafer 88. While the first and third seed wafers 83 and 88 are illustrated without any degradation of the shape and appearance of the material, it is observed over time that cracks and disintegration are normal as the seeds in the seed wafers sprout and grow. Roots grow downward into the growth medium 82. In this way, the shaped seed wafer products 83, 86 and 88 evolve and grow into a living memorial from the cremains of the deceased.

Conclusion. In the previous description, for purposes of explanation, specific details are set forth in order to provide an understanding of the invention. It should be apparent, however, to one skilled in the art that the invention can be practiced without these specific details. In other instances, structures, devices, systems and methods are shown only in block diagram form in order to avoid obscuring the invention.

Reference in this specification to "one embodiment", "an embodiment", or "implementation" means that a particular feature, structure, or characteristic described in connection with the embodiment or implementation is included in at least one embodiment or implementation of the invention. Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be evident that the various modification and changes can be made to these embodiments without departing from the broader spirit of the invention. In this technology, advancements are frequent and further advancements are not easily foreseen. The disclosed embodiments may be readily modifiable in arrangement and detail as facilitated by enabling technological advancements without departing from the principles of the present disclosure.

We claim:

1. A shaped seed wafer for serving as a memorial to the deceased, the shaped seed wafer comprising:
   approximately one measure of cremated and pulverized remains of a pet or human; at least 60 measures of a solid growth medium mixed substantially uniformly with the one measure of remains; and approximately one measure of perennial plant seeds mixed with the remains and growth medium; wherein the mixture of the remains, solid growth medium, and seeds is formed into at least one of a two-dimensional shape and a three-dimensional shape.

2. The shaped seed wafer of claim 1, and wherein the shaped seed wafer further comprises green tea generated from steeped green tea leaves.

3. The shaped seed wafer of claim 1, and wherein the shaped seed wafer further comprises dried and pulverized green tea leaves.

4. A method for forming shaped seed wafers, the method comprising:
   mixing approximately one measure of cremated and pulverized remains of a pet or human with at least 60 measures of a solid growth medium;
   mixing approximately one measure of plant seeds with the remains and growth medium;
   pressing the solid growth medium, remains and plant seeds into a sheet;
   cutting silhouettes from the sheeted mixture; and
   drying, undisturbed, the cut silhouettes to a substantially equilibrium amount of moisture.

5. The method for forming shaped seed wafers of claim 4, and wherein the plant seeds include seeds from a plurality of perennial flowering plants.

6. The method for forming shaped seed wafers of claim 4, and wherein the plant seeds include seeds from a plurality of annual flowering plants.

7. The method for forming shaped seed wafers of claim 4, and wherein the sheet is at least 0.37 inches thick prior to cutting the silhouettes from the sheeted mixture.

8. The method for forming shaped seed wafers of claim 4, and wherein the growth medium includes at least two of a soil, a soil compost, a humus and a peat.

9. The method for forming shaped seed wafers of claim 8, and wherein the growth medium further includes at least one of a vermicompost and a post-ferment bokashi.

10. The method for forming shaped seed wafer of claim 4, and wherein the method further comprises:
    before mixing the plant seeds with the solid growth medium and remains, mixing a portion of pulverized tea leaves into the mixture of solid growth medium and remains.

11. The method for forming shaped seed wafer of claim 4, and wherein the method further comprises:
    before mixing the plant seeds with the solid growth medium and remains, mixing a portion of liquid tea extract into the mixture of solid growth medium and remains.

12. A shaped seed wafer formed from the process comprising:
    mixing approximately one measure of cremains of a pet or human with at least 50 measures of a solid growth medium;
    mixing approximately one measure of plant seeds with the cremains and growth medium;
    pressing the solid growth medium, cremains and plant seeds into a sheet;
    extracting silhouettes from the sheeted mixture; and
    drying, undisturbed, the extracted silhouettes to a substantially equilibrium amount of moisture.

13. The shaped seed wafer formed from the process of claim 12, and wherein the plant seeds include seeds from a plurality of perennial flowering plants.

14. The shaped seed wafer formed from the process of claim 12, and wherein the plant seeds include seeds from a plurality of annual flowering plants.

15. The shaped seed wafer formed from the process of claim 12, and wherein the sheet is at least 0.30 inches thick prior to extracting the silhouettes from the sheeted mixture.

16. The shaped seed wafer formed from the process of claim 12, and wherein the growth medium includes at least two of a soil, a soil compost, a humus and a peat.

17. The shaped seed wafer formed from the process of claim 12, and wherein the growth medium further includes at least one of a vermicompost and a post-ferment bokashi.

18. The shaped seed wafer formed from the process of claim 12, and wherein extracting silhouettes from the sheeted mixture includes pressing a three-dimensional contoured mold onto the sheet of material and isolating the pressed shaped.

19. The shaped seed wafer formed from the process of claim 12, and wherein the process further comprises:

before mixing the cremains with the growth medium, adjusting the pH of the growth medium to within a range of preferred pH for the plant seeds taking into account a pH of the cremains.

20. The shaped seed wafer formed from the process of claim 12, and wherein extracting silhouettes from the sheeted mixture includes forming letters into a top surface of the sheeted material.

* * * * *